(12) United States Patent
Ghosh et al.

(10) Patent No.: US 9,854,520 B2
(45) Date of Patent: Dec. 26, 2017

(54) POWER SAVING CHANNEL ACCESS FOR WIRELESS DEVICES IN DENSE WIRELESS NETWORKS

(71) Applicant: INTEL IP CORPORATION, Santa Clara, CA (US)

(72) Inventors: Chittabrata Ghosh, Fremont, CA (US); Chen Kojokaro, Yoqneam Illit (IL); Eldad Perahia, Portland, OR (US); Shahrnaz Azizi, Cupertino, CA (US)

(73) Assignee: Intel IP Corporation, Santa Clara, CA (US)

( * ) Notice: Subject to any disclaimer, the term of this patent is extended or adjusted under 35 U.S.C. 154(b) by 231 days.

(21) Appl. No.: 14/671,350

(22) Filed: Mar. 27, 2015

(65) Prior Publication Data

US 2016/0212702 A1 Jul. 21, 2016

Related U.S. Application Data

(60) Provisional application No. 62/105,634, filed on Jan. 20, 2015.

(51) Int. Cl.
*H04W 52/02* (2009.01)
*H04W 56/00* (2009.01)
(Continued)

(52) U.S. Cl.
CPC .......... *H04W 52/0216* (2013.01); *H04L 5/00* (2013.01); *H04W 56/001* (2013.01);
(Continued)

(58) Field of Classification Search
CPC .......... H04W 52/0216; H04W 56/001; H04W 72/1268; H04W 84/12; H04L 5/00; Y02B 60/50

See application file for complete search history.

(56) References Cited

U.S. PATENT DOCUMENTS

2013/0230035 A1 9/2013 Grandhi et al.
2013/0250832 A1* 9/2013 Kim .................. H04W 52/0216
370/311

(Continued)

FOREIGN PATENT DOCUMENTS

WO 2014011006 1/2014
WO 2015005677 1/2015

OTHER PUBLICATIONS

International Search Report from Application No. PCT/US2015/066827 dated Apr. 11, 2016. (18 pgs.).

(Continued)

*Primary Examiner* — Luat Phung
(74) *Attorney, Agent, or Firm* — Eversheds Sutherland (US) LLP (57) ABSTRACT

Example systems, methods, and devices for channel access in dense wireless networks are discussed. More specifically, methods may include transmitting one or more trigger frames from an access point to one or more communication stations, the one or more trigger frames comprising a plurality of components, the plurality of components indicating whether trigger frames within a beacon interval are scheduled in a periodic or aperiodic manner, and if periodic trigger frames are scheduled, then indicating a countdown to the next trigger frame, and if aperiodic trigger frames are scheduled, then indicating the time to the next trigger frame scheduled by the access point. Methods, apparatus, and systems described herein can be applied to 802.11ax or any other wireless standard.

20 Claims, 7 Drawing Sheets

(51) Int. Cl.
  H04W 72/04    (2009.01)
  H04W 72/12    (2009.01)
  H04L 5/00     (2006.01)
  H04W 84/12    (2009.01)

(52) U.S. Cl.
  CPC ........ *H04W 72/1268* (2013.01); *H04W 84/12* (2013.01); *Y02B 60/50* (2013.01)

(56) References Cited

U.S. PATENT DOCUMENTS

| | | | | |
|---|---|---|---|---|
| 2014/0211680 | A1* | 7/2014 | Seok | H04W 52/0216 370/311 |
| 2015/0071211 | A1* | 3/2015 | Seok | H04W 74/04 370/329 |
| 2015/0365891 | A1* | 12/2015 | Marcks Von Wurtemberg | H04W 52/0206 370/311 |
| 2016/0249383 | A1* | 8/2016 | Kwon | H04W 72/04 |
| 2016/0337969 | A1* | 11/2016 | Park | H04W 52/0216 |

OTHER PUBLICATIONS

Back, Jaejong, et al. A Novel Pre-Authentication Scheme Based on Fast Channel Switching in IEEE 802.11 WLANs, EURASIP Journal on Wireless Communications and Networking 2012 (Feb. 9, 2012) (http://jwcn.eurasipjournals.springeropen.com/articles/10.1186/1687-1499-2013-39).

* cited by examiner

POWER SAVING CHANNEL ACCESS FOR WIRELESS DEVICES IN DENSE WIRELESS NETWORKS

CROSS-REFERENCE TO RELATED APPLICATIONS

This application claims priority to U.S. Provisional Patent Application No. 62/105,634 filed on Jan. 20, 2015, the entire contents of which are incorporated herein by reference.

TECHNICAL FIELD

Embodiments described herein generally relate to wireless networks and, more particularly, to a method and apparatus for accessing a channel in a WLAN system.

BACKGROUND

With recent development of information communication technologies, a variety of wireless communication technologies have been developed. From among such technologies, WLAN is a technology that allows wireless access to the Internet at home, in businesses, or in specific service providing areas using a mobile terminal, such as a personal digital assistant (PDA), a laptop computer, and a portable multimedia player (PMP), based on radio frequency technology.

In order to overcome limited communication speed, which has been pointed out as a possible weak point of WLAN, technical standards have recently introduced a system capable of increasing the speed and reliability of a network while extending a coverage region of a wireless network. For example, IEEE 802.11n supports high throughput (HT) with a maximum data processing speed of 540 Mbps. In addition, Multiple Input and Multiple Output (MIMO) technology, which employs multiple antennas for both a transmitter and a receiver in order to minimize transmission errors and to optimize data rate, has been introduced. A next generation WLAN, IEEE 802.11ax or High-Efficiency WLAN (HEW), is under development. Uplink multiuser MIMO (UL MU-MIMO) and Orthogonal Frequency-Division Multiple Access (OFDMA) are two major features included in the new standard.

DETAILED DESCRIPTION

The systems, methods, and devices described in the present disclosure provide techniques for channel access in densely deployed wireless networks. The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Details of one or more implementations are set forth in the accompanying drawings and in the description below. Further embodiments, features, and aspects will become apparent from the description, the drawings, and the claims. Embodiments set forth in the claims encompass all available equivalents of those claims.

Example embodiments described herein provide systems, methods, and devices, for channel access for Internet of Things-based (IoT-based) communication stations (STAs) in densely deployed WLAN networks, including but not limited to IEEE 802.11ax.

Carrier sense multiple access (CSMA) is a probabilistic media access control (MAC) protocol in which a node verifies the absence of other traffic before transmitting on a shared transmission medium, such as an electrical bus, or a band of the electromagnetic spectrum. Carrier sense means that a transmitter uses feedback from a receiver to determine whether another transmission is in progress before initiating a transmission. That is, it tries to detect the presence of a carrier wave from another station before attempting to transmit. If a carrier is sensed, the station waits for the transmission in progress to finish before initiating its own transmission. In other words, CSMA is based on the principle "sense before transmit" or "listen before talk". Multiple access means that multiple stations send and receive on the medium. Transmissions by one node are generally received by all other stations connected to the medium. In some CSMA collision avoidance (CSMA-CA) protocol, STAs contend for a medium using a contention window (CW) chosen from 0 to 31 in order to operate in a channel of 20 MHz or 40 MHz. However, in the example systems, methods, and devices disclosed herein, scheduled channel access is used instead of the channel access using CSMA-CA.

In developing DensiFi, a new Wi-Fi standard included in the IEEE 802.11ax (High-Efficiency WLAN (HEW)), there is an ongoing discussion on scheduled medium access using orthogonal frequency division multiple access (OFMDA), where a scheduling message from the access point (AP) may indicate a communication station's (STA's) ID, assigned sub-channels, and duration of access. However, this scheduling message can grow exponentially with increasing number of user devices or STAs and sub-channel allocations per user device or STA. This could be one drawback of a centralized scheduled OFDMA channel access method.

Example embodiments described herein provide systems, methods, and devices, for channel access for Internet of Things-based (IoT-based) communication stations (STAs) in densely deployed wireless local area networks (WLANs). Example systems, methods, and devices disclosed herein provide a power efficient channel access mechanism for very low power IoT STAs using a scheduling message, which may be termed as a trigger frame. A trigger frame may be any data frame that may be used communicate with a STA. A trigger frame, for example, can include a downlink data frame, a buffered frame, or simply a scheduling message that may be sent to a STA. Trigger frames may be transmitted using channel contention, and a subset of these trigger frames may be used for IoT devices. Example systems, methods, and devices disclosed also provide a new sleep mode, which may be termed as a shallow sleep mode, while a deep sleep mode may be used for the mode when STAs consume the least power. For the purposes of this disclosure, shallow sleep mode may be defined as a mode where a STA may consume higher power than a deep sleep mode but may be able to transition to active or listen mode faster than from the deep sleep mode.

The terms "communication station", "station", "handheld device", "mobile device", "wireless device" and "user equipment" (UE), as used herein, refer to a wireless communication device such as a cellular telephone, smartphone, tablet, netbook, wireless terminal, laptop computer, a wearable computer device, a femtocell, High Data Rate (HDR) subscriber station, access point, access terminal, or other personal communication system (PCS) device. The device may be either mobile or stationary.

The term "access point" (AP) as used herein may be a fixed station. An access point may also be referred to as an access node, a base station or some other similar terminology known in the art. An access terminal may also be called a mobile station, user equipment (UE), wireless communication device or some other similar terminology known in the art. Embodiments disclosed herein generally pertain to wireless networks. Some embodiments can relate to wireless networks that operate in accordance with one of the IEEE 802.11 standards including the IEEE 802.11ax standard.

Figure 1:
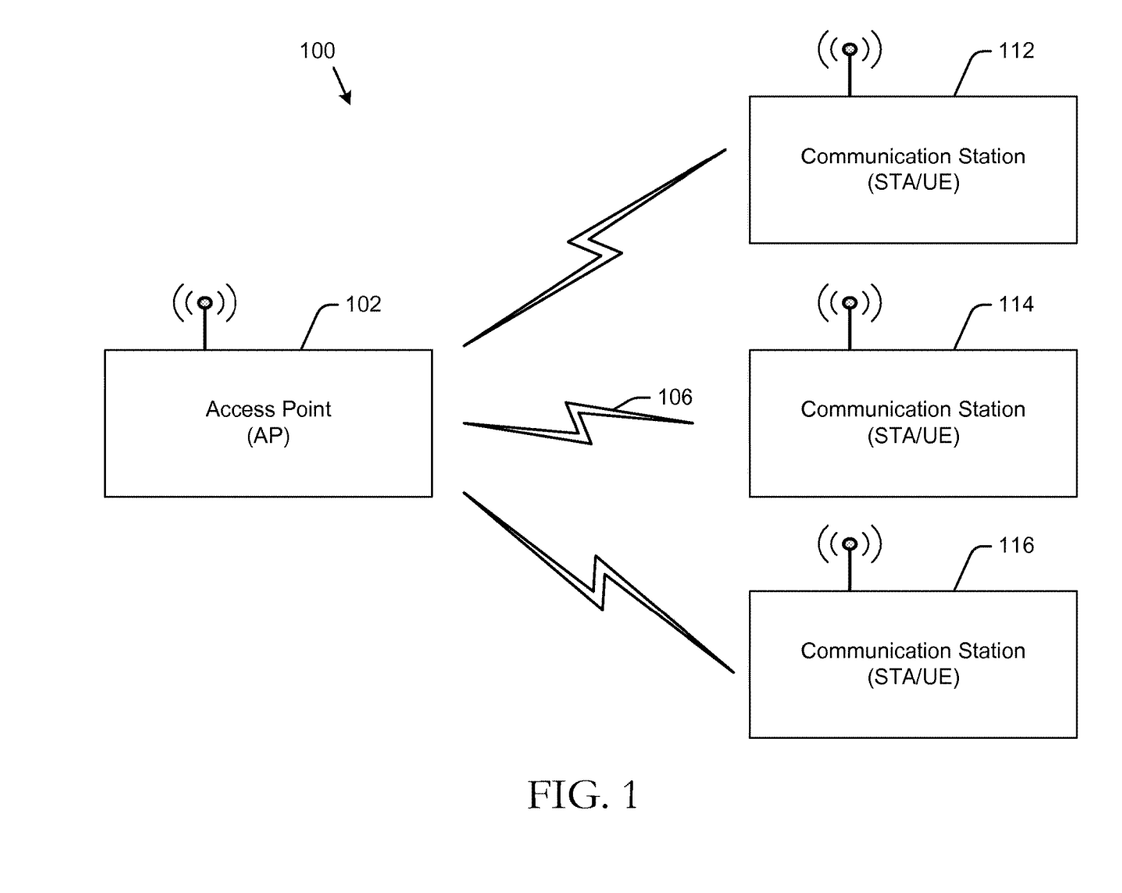
FIG. 1 is a network diagram illustrating an example network environment, according to one or more example embodiments.

FIG. 1 is a network diagram illustrating an example network environment, according to some example embodiments. Wireless network 100 can include one or more communication stations (STAs) 112, 114, 116 and one or more access points (APs) 102, which may communicate via a communication medium 106 in accordance with IEEE 802.11 communication standards, including IEEE 802.11ax. The communication stations 112, 114, 116 may be mobile devices that are non-stationary and do not have fixed locations or they may be stationary and have fixed locations. The one or more APs may be stationary and have fixed locations. Communication stations 112, 114, 116 may include, for example, one or more IoT-based STAs, hereinafter referred to as IoT devices.

In accordance with some IEEE 802.11ax (High-Efficiency WLAN (HEW)) embodiments, an access point may operate as a master station which may be arranged to contend for a wireless medium (e.g., during a contention period) to receive exclusive control of the medium for an HEW control period (i.e., a transmission opportunity (TXOP)). The master station may transmit an HEW master-sync transmission at the beginning of the HEW control period. During the HEW control period, HEW stations may communicate with the master station in accordance with a non-contention based multiple access technique. This is unlike conventional Wi-Fi communications in which devices communicate in accordance with a contention-based communication technique, rather than a multiple access technique. During the HEW control period, the master station may communicate with HEW stations using one or more HEW frames. Furthermore, during the HEW control period, legacy stations refrain from communicating. In some embodiments, the master-sync transmission may be referred to as an HEW control and schedule transmission.

In some embodiments, the multiple-access technique used during the HEW control period may be a scheduled orthogonal frequency division multiple access (OFDMA) technique, although this is not a requirement. In other embodiments, the multiple access technique may be a time-division multiple access (TDMA) technique or a frequency division multiple access (FDMA) technique. In certain embodiments, the multiple access technique may be a space-division multiple access (SDMA) technique.

The master station may also communicate with legacy stations in accordance with legacy IEEE 802.11 communication techniques. In some embodiments, the master station may also be configurable communicate with HEW stations outside the HEW control period in accordance with legacy IEEE 802.11 communication techniques, although this is not a requirement.

In other embodiments, the links of an HEW frame may be configurable to have the same bandwidth and the bandwidth may be one of 20 MHz, 40 MHz, or 80 MHz contiguous bandwidths or an 80+80 MHz (160 MHz) non-contiguous bandwidth. In certain embodiments, a 320 MHz contiguous bandwidth may be used. In other embodiments, bandwidths of 5 MHz and/or 10 MHz may also be used. In these embodiments, each link of an HEW frame may be configured for transmitting a number of spatial streams.

Orthogonal Frequency-Division Multiple Access (OFDMA) is another feature of 802.11ax. OFDMA can experience reception jamming if the AP 102 does not know the clear channel assessment (CCA) status of the communication stations STAs 112, 114, 116 or the STA does not reserve the channel for receiving long packets. Certain example methods and apparatuses for channel access for Internet of Things-based (IoT-based) communication stations (STAs) in densely deployed WLAN networks are detailed in FIGS. 2-7.

In an example network discovery operation including an active scanning process, an STA configured to perform scanning transmits a probe request frame and waits for a response to the probe request frame, in order to move between channels and search for nearby APs. A responder transmits a probe response frame to the STA having transmitted the probe request frame, in response to the probe request frame. Herein, the responder may be the last STA that has transmitted a beacon frame in a basic service set (BSS) of the scanned channel. In the BSS, the AP transmits a beacon frame, and thus the AP serves as the responder. In an independent basic service set (IBSS), STAs within the IBSS transmit a beacon frame in rotation, and thus the responder is not fixed. For example, the STA that has transmitted the probe request frame on Channel #1 and has received the probe response frame on Channel #1 may store BSS-related information that is contained in the received probe response frame and move to the next channel (for example, Channel #2) to perform scanning (e.g., transmission/reception of a probe request/response on Channel #2) in the same manner.

Scanning may also be carried out in the passive scanning manner. In performing the passive scanning operation, an STA performing scanning waits for a beacon frame while moving from one channel to another. The beacon frame, which is one of the management frames in IEEE 802.11, is periodically transmitted to inform of presence of a wireless network and to allow the STA performing scanning to find a wireless network and participate in the wireless network.

In a BSS, the AP periodically transmits the beacon frame. In an IBSS, STAs of the IBSS transmit the beacon frame in rotation. When an STA performing scanning receives a beacon frame, the STA stores information about the BSS contained in the beacon frame and moves to the next channel. In this manner, the STA records beacon frame information received on each channel. The STA having received a beacon frame stores BSS-related information contained in the received beacon frame, and then moves to the next channel and performs scanning in the same manner.

STAs in some WLAN systems perform channel sensing before they perform transmission/reception operation. Persistently performing channel sensing causes persistent power consumption of the STA. There is not much difference in power consumption between the reception mode and the transmission mode, and continuous maintenance of the reception mode may cause large load to STAs which are provided with limited power (i.e., operated by a battery). Therefore, if an STA maintains the reception standby mode so as to persistently sense the channel, power is inefficiently consumed without special advantages in terms of WLAN throughput. To address this problem, the WLAN system supports a power management (PM) mode of the STA.

The PM mode of the STA is classified into an active mode and a power save (PS) mode. The STA is basically operated in the active mode. The STA operating in the active mode maintains an awake mode. When the STA is in the awake mode, the STA may normally perform frame transmission/reception, channel scanning, or the like. On the other hand, the STA in the PS mode operates by switching between the sleep mode (or doze mode) and the awake mode. The STA in the sleep mode operates with minimum power and performs neither frame transmission/reception nor channel scanning.

As the time for which the STA operates in the sleep mode increases, power consumption of the STA is reduced, and accordingly the STA operation duration increases. However, since transmission or reception of the frame is not allowed in the sleep mode, the STA cannot unconditionally operate in the sleep mode for a long time. When the STA operating in the sleep mode has a frame to transmit to the AP, it may be switched to the awake mode to transmit/receive the frame. On the other hand, when the AP has a frame to transmit to the STA which is in the sleep mode, the STA cannot receive the frame nor recognize the presence of the frame. Accordingly, in order to recognize presence or absence of a frame to be transmitted to the STA (or in order to receive the frame if the frame is present), the STA may need to switch to the awake mode according to specific periodicity.

According to one or more example embodiments, IoT STAs 112, 114, 116 illustrated in FIG. 1 may not receive or decode beacon frames at all. However, they may receive one or more trigger frames from AP 102. A trigger frame may be any data frame that may be used communicate with a STA. A trigger frame, for example, can include a downlink data frame, a buffered frame, or simply a scheduling message that may be sent to a STA.

Figure 2:
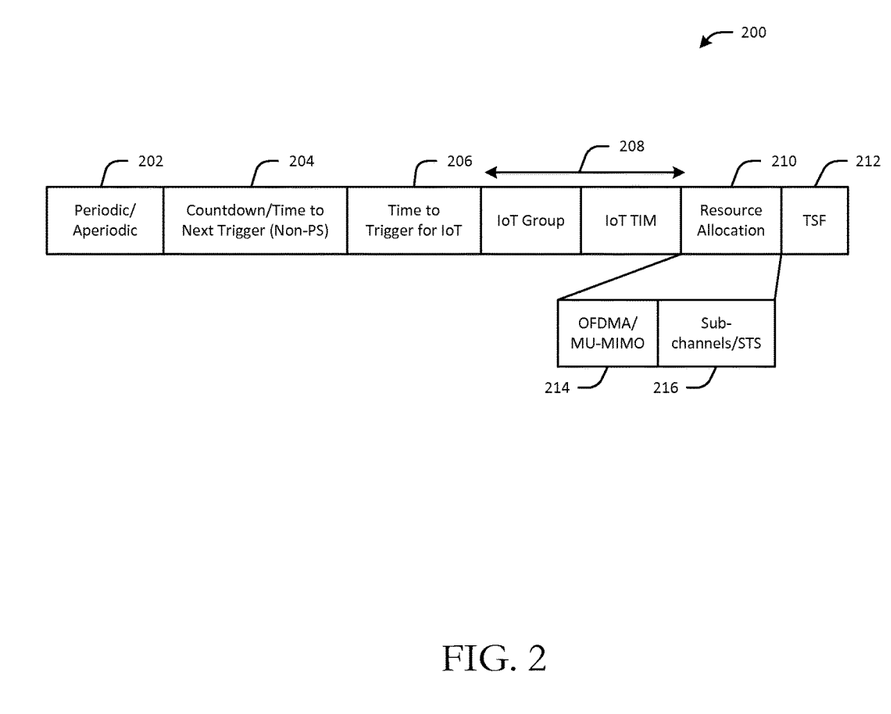
FIG. 2 illustrates partial frame format of a trigger frame for channel access of Internet of Things (IoT) communication stations (STAs), according to one or more example embodiments.

According to one or more example embodiments, based on channel access of IoT STAs, a minimal set of information fields in every trigger frame may be designed and implemented as illustrated in FIG. 2. For example. FIG. 2 illustrates partial frame format 200 of a trigger frame for channel access of IoT STAs 114, 116, according to one or more example embodiments. The AP 102 may determine, based on the type of the device the trigger frames are being sent to, a periodicity of the trigger frames. Periodic or aperiodic component 202 may indicate whether trigger frames within a beacon interval may be scheduled in a periodic or aperiodic manner. For example, bit set to 1 may imply periodic and 0 may indicate otherwise. In the countdown or time to next trigger component 204 if periodic trigger frames are indicated in component 202, then this field may indicate the countdown, and if aperiodic trigger frames are indicated, then this field may indicate the time to the next trigger frame scheduled by the AP. Time to trigger for IoT component 206 may indicate the next time when AP may intend to schedule a trigger frame for IoT devices, and if the value in this field is 0, then the current trigger frame may be scheduled for IoT devices. The trigger frame format 200 may optionally include an IoT group 208, which may indicates the IoT group that the AP intends to schedule in the current trigger frame assigned for IoT STAs. The trigger frame format 200 may also include an IoT TIM 208, which may indicate the bitmap of DL buffered indication for the IoT STAs in the group indicated by the IoT group field and each bit in the bitmap may indicate the presence or absence of DL buffered data mapped to the AID location in the IoT Group, such that STAs with no DL buffered data may go back to deep sleep right-away.

Trigger frame format 200 may also include resource allocation 210 which may indicate the resources allocated to each of the IoT STAs for UL data traffic, for example. This field may include two sub-fields 214, 216. OFDMA or MU-MIMO component 214 may indicate whether the AP intends to allocate resources using OFDMA or MU-MIMO. If the bit is set to 0, then it may indicate OFDMA and if it is set to 1, then it may indicate MU-MIMO. Trigger frame format 200 may also include a timer synchronization function (TSF) component 212, which may indicate the TSF timer referring to the clock time of the AP. This field may assist an IoT STA to synchronize with the clock of the AP, for example. The TSF is a 64 bit timer running at 1 MHz and can be updated by beacon and probe response frames from other stations. The tolerance of such timer can be 25 ppm, and the value of the timer may be located in the beacon and probe response frames as a timestamp. When an ad-hoc station first begins operation, it may reset its TSF timer to zero and send several probe request frames attempting to find a BSS already in operation. The probe request, probe response and ack sequence may take approximately 1 millisecond. The AP may then start sending beacon frames (the default is every 100 ms) containing the TSF clock and the beacon period. This may establish the basic beaconing period of the IBSS.

According to yet another embodiment, the significance of time indication of trigger for IoT STAs in every trigger frame may be explained by use of sub-channels or short training sequence (STS) component 216. If the prior subfield indicates OFDMA, then this field may indicate the sub-channels allocated to each of the STAs ordered in terms of the association IDs (AIDs) in IoT Group. If the prior sub-field indicates MU-MIMO, then this field may indicate the number of spatial streams allocated to each STA, for example.

Based on the value indicated in time to trigger for IoT field 206, low power STAs may decide to switch to shallow sleep mode or deep sleep mode. For instance, if value in time to trigger for IoT is less than or equal to 3 ms, then the STA may switch to shallow sleep mode. Otherwise, STA may switch to deep sleep mode. Each IoT device, however, can have its clock shifted by a certain amount with reference to AP's clock, hence all STAs within a BSS may communicate with the AP to receive the TSF and update its internal clock.

The value in time to trigger for IoT field 206 facilitates an IoT device to decode any one trigger frame and not each and every trigger frame.

Based on the value indicated in time to trigger for IoT field 206, a low power STA may decide on specific circuits to switch off, within shallow sleep, and let certain other circuits to be turned on, for example. Latency issues for switching ON or OFF each of the device components can be determined to define the right threshold for transitioning to either shallow sleep or deep sleep modes. One advantage of the example embodiments disclosed herein is that power efficient channel access can be provided for very low power IoT-STAs. These IoT STAs do not receive or decode beacon frames and can receive information directly from trigger frames.

Figure 3:
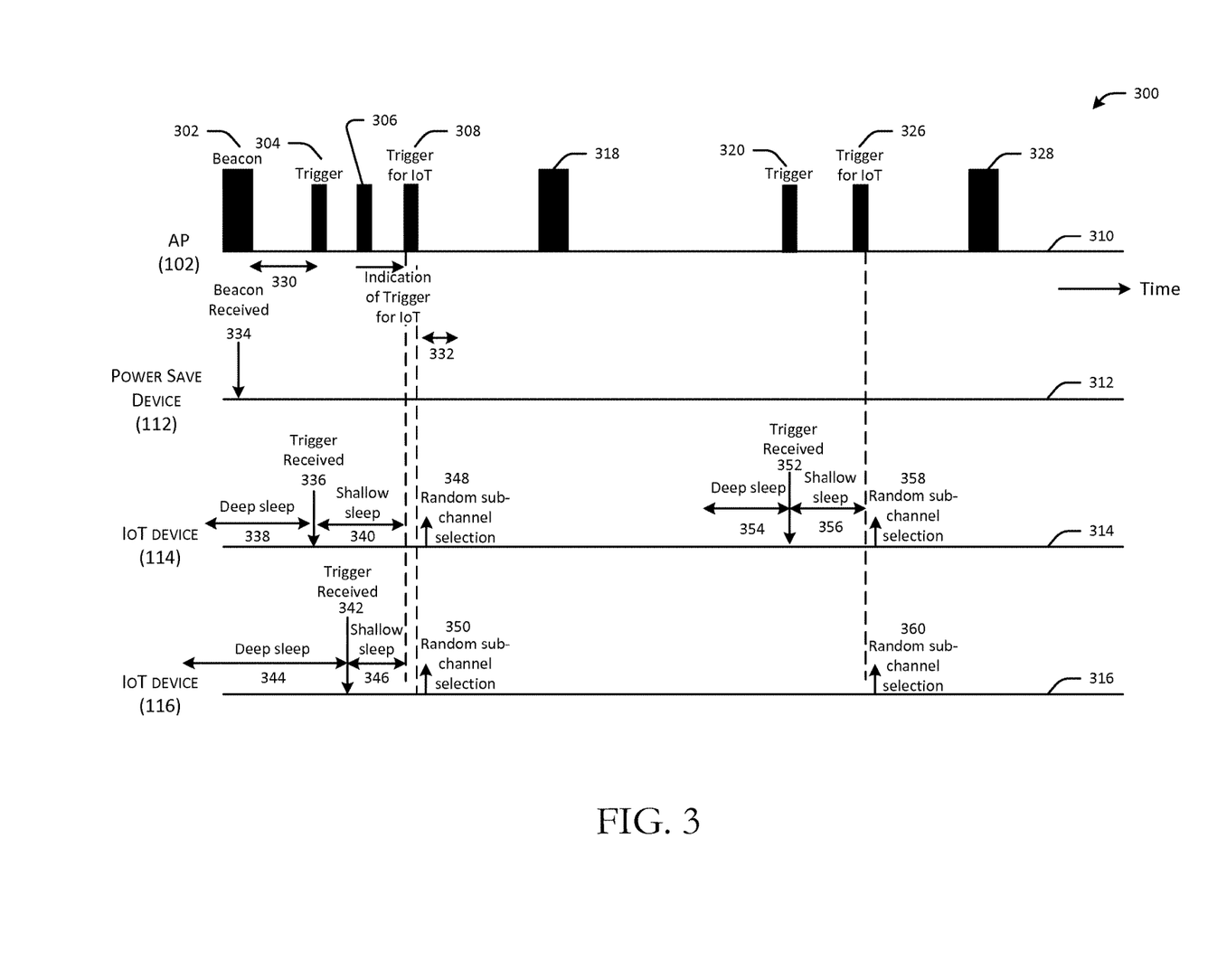
FIG. 3 illustrates example timing diagram of frame transmissions from AP and IoT devices, depicting deep sleep and shallow sleep modes, according to one or more example embodiments.

Turning now to FIG. 3, a time indication in a trigger frame that may indicate the next scheduled trigger frame may be assigned for IoT STAs 112, 114, 116. The time indication may be utilized in defining multiple sleep modes (or doze modes) for the STAs, for example, a shallow sleep or deep sleep mode for short-term or long-term sleep optimization. Additionally, a periodicity interval field may be included following the periodic or aperiodic field that may indicate the interval of periodic transmission of trigger frames for IoTs, interpreted for example in terms of Traffic Units (TUs).

FIG. 3 illustrates an example channel access via a timing diagram 300 of frame transmissions from AP 102 to IoT devices 112, 114, and 116, depicting deep sleep and shallow sleep modes, according to one or more example embodiments. For the purposes of this example, power save device 112 may be user device such as a smartphone, tablet or laptop computer, and IoT devices 114, 116 may be any lower power devices such as a thermostat, a lamp, a water sprinkler, or a fire alarm. The sequence of operation between the AP 102 and STAs 112, 114, and 116 is depicted along time lines 310, 312, 314, and 316 respectively. As shown in FIG. 3, AP 102 may transmit one or more beacon frames 302, 318, 328 and one or more trigger frames 304, 306, 308, 320, 326 between the beacon frames 302, 318, 328. The time interval between two beacon frames may be defined as a beacon interval. Of the one of more trigger frames 304, 306, 308, 320, 326 that may be transmitted to any STA, some of them or a subset of them may be trigger frames 306, 308, 326 designated for the IoTs 114, 116. These trigger frames may be used by the AP to communicate with STAs 112-116, and assist them in power management by providing information that may be utilized in determining when to transition between power modes, such as between a deep sleep mode, a shallow sleep mode and an awake or active mode. An awake mode may be defined as a state where the STA or IoT device may receive one or more data frames that may be buffered at the AP.

Starting from the top left of FIG. 3, AP 102 may transmit a beacon frame 302 to a power saving device 112, which may be a user device such as a smartphone or tablet. Arrow 334 indicates the point where this power save device 112 may have received the beacon frame from the AP. After a predetermined period of time 330, which may be the universal resource application platform (URAP) time, AP 102 may transmit one or more trigger frames 304, 306, 308 to the IoT devices 114, 116. The IoT device 114 shown in time line 314 may receive at 336 the trigger frame 304, at which point, the IoT device 114 may transition from a deep sleep mode 338 to a shallow sleep 340 where the IoT device 114 may not consume as much power as an awake mode, but still more than while in a deep sleep mode. IoT device 116 may receive at 342 the trigger frame 306, at which point the IoT device 116 may transition from a deep sleep mode 344 to a shallow sleep mode 346. At this point, both IoT devices 114 and 116 are ready to receive data frames that may be buffered at AP 102. Further along that line, IoT devices 114 and 116 may receive another trigger frame 308 that may include resource allocation information for receiving the data frames. For example, trigger frames 308 may indicate a random sub-channel selection 348, 350 for transfer of data frames to the IoT devices 114, 116, respectively. Around the same time, power save device 112 may use a short inter-frame space (SIFS) 332, which can be defined as the amount of time required for the device 112 to process a received frame and to respond with a response frame.

Similarly, IoT device 114 may receive at 352 the trigger frame 320, at which point the IoT device 114 may transition from a deep sleep mode 354 to a shallow sleep mode 356. At this point, IoT device 114 is ready to receive data frames that may be buffered at AP 102. Further along that line, IoT device 114 may receive another trigger frame 358 that may include resource allocation information for receiving the data frames. For example, trigger frames 326 may indicate a random sub-channel selection 358, 360 for transfer of data frames to the IoT devices 114, 116, respectively.

According to one example embodiment, the AP 102 may indicate a time for a next trigger frame for IoT STAs 114, 116 in every trigger frame such that IoT STAs wake up from deep sleep to receive any one trigger frame and be informed of the next scheduled trigger frame for IoT STAs 114, 116. Since the IoT STAs do not receive or decode beacon frames 302, 318, 328, which may be typically 250 bytes, there may be significant reduction in power consumption of these devices. Moreover, the time indication to next trigger frame assigned to IoT STAs 206 may facilitate STAs in switching ON/OFF certain RF and baseband components. This may additionally assist the STAs in quick wake-up times.

Figure 4:
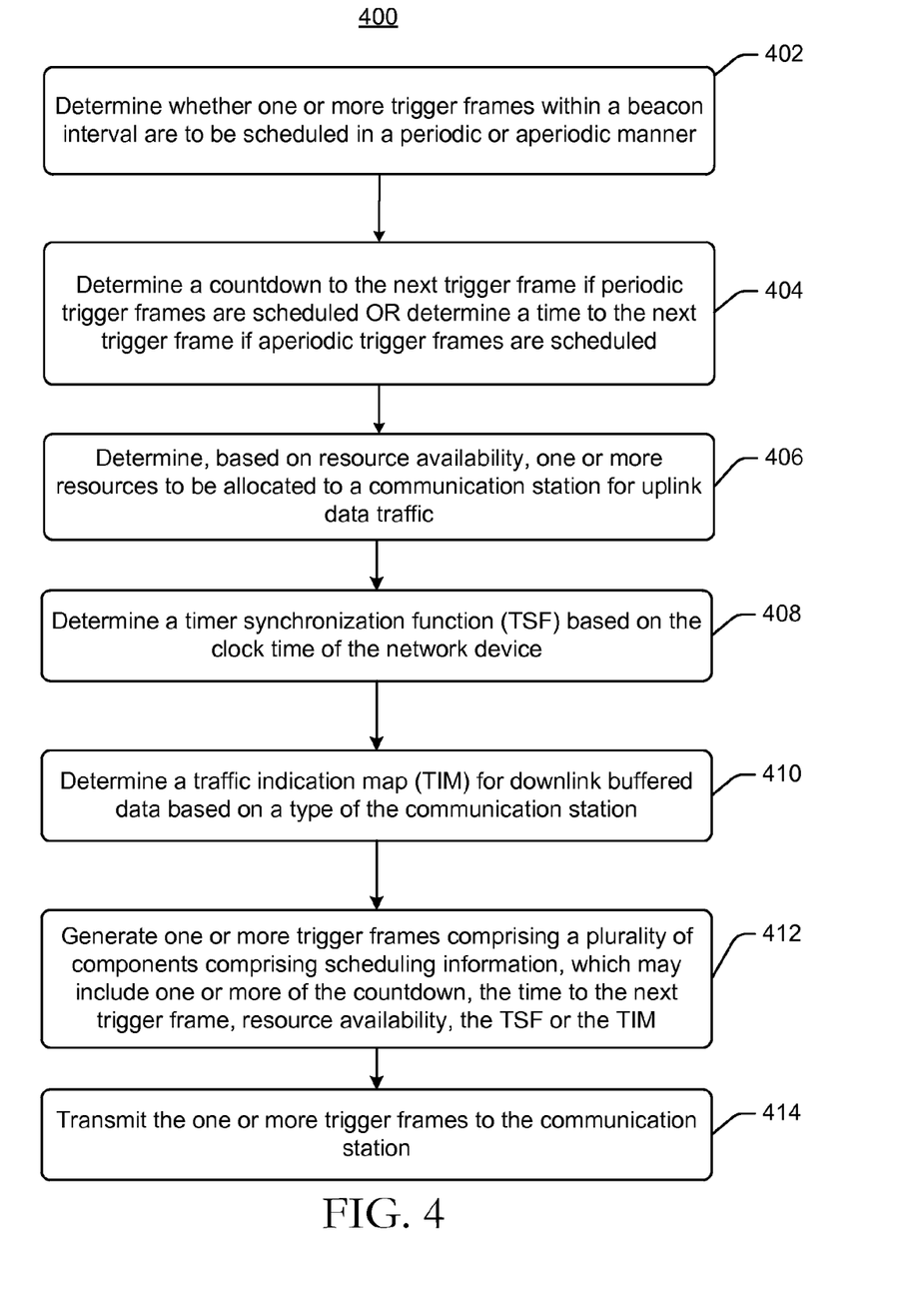
FIG. 4 illustrates example operations in a method for use in systems and devices, according to one or more example embodiments.
Figure 5:
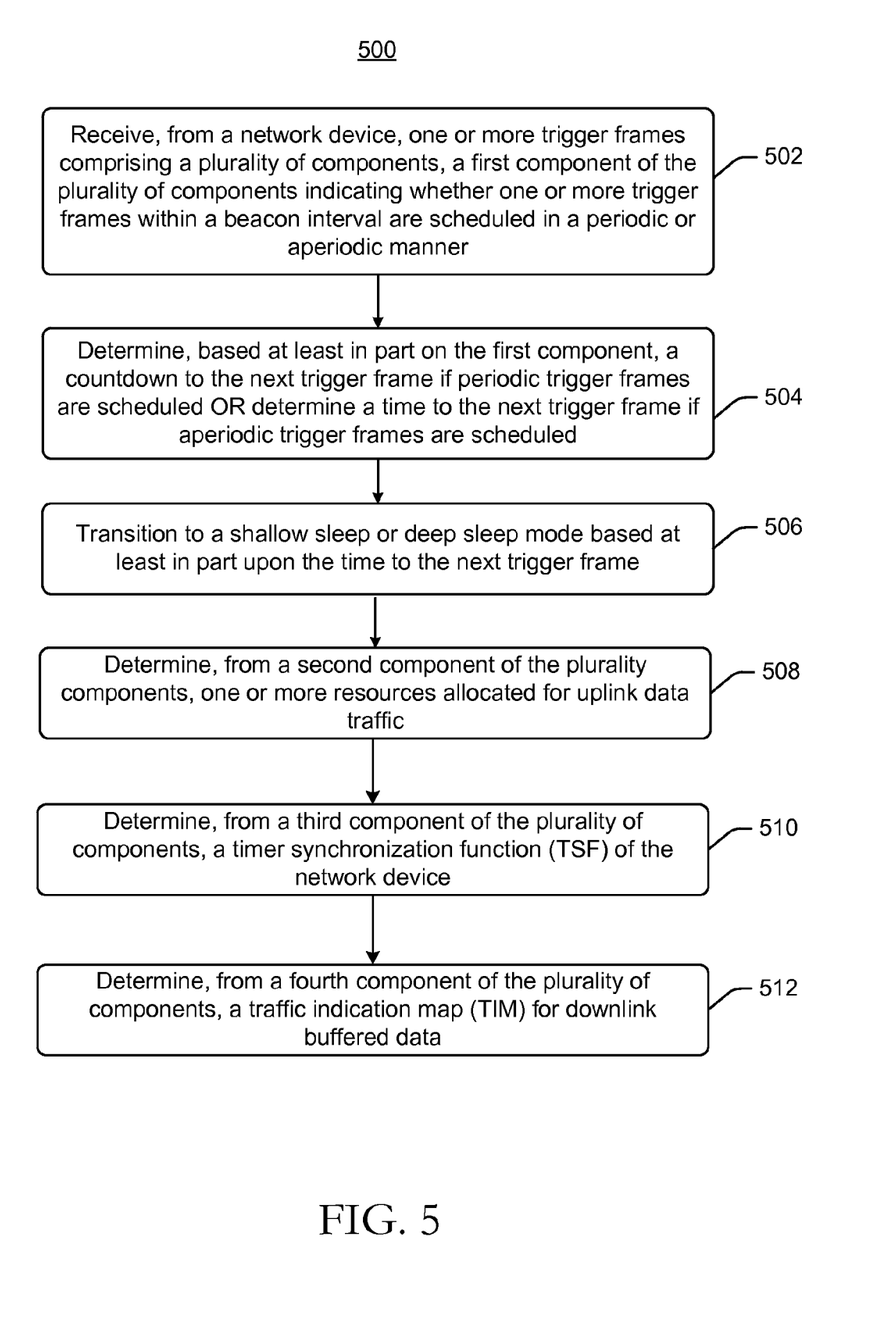
FIG. 5 illustrates example operations in a method for use in systems and devices, according to one or more example embodiments.

FIGS. 4 and 5, for example, illustrate example operations that may be involved in a method for channel access in a Wi-Fi network, according to one or example embodiments. The method 400 as shown in FIG. 4 may include the operation 402 where the network device, wireless communication device, or access point may determine, based on a type of device receiving the trigger frames, whether one or more trigger frames within a beacon interval are to be scheduled in a periodic or aperiodic manner. In operation 404, if periodic trigger frames are scheduled, then a countdown may be indicated, and if aperiodic trigger frames are scheduled, then a time to the next trigger frame scheduled by the device may be indicated. In operation 406, the network device may also be configured to identify one or more resources allocated to the communication station for uplink data traffic. The network device may further be configured to identify whether the resources are allocated using orthogonal frequency division multiple access (OFDMA) or multi-user multiple-input multiple-output (MU-MIMO) protocol. The device may further be configured to identify one or more sub-channels allocated to the communication station if OFDMA is selected. The device may also be configured to identify a number of spatial streams allocated to the communication station if MU-MIMO is selected. In operation 408, the network device may also be configured to transmit, to the communication station, a timer synchronization function (TSF) of the device. In operation 410, the network device may transmit a traffic indication map (TIM) of downlink buffered data to the one or more user devices. In operation 412, the network device may generate one or more trigger frames comprising a plurality of components comprising this scheduling information. In example operation 414, the network device may transmit the one of more trigger frames to the communication station.

FIG. 5 illustrates example operations in a method 500 executed by one or more wireless communication devices or IoT devices or communication stations to gain channel access in a dense wireless network, according to one or more example embodiments. In operation 502, for example, the IoT device may receive, from a network device or access point, one or more trigger frames comprising a plurality of components, the plurality of components indicating whether one or more trigger frames within a beacon interval are scheduled in a periodic or aperiodic manner. In operation 504, the IoT device may determine a countdown to the next trigger frame if periodic trigger frames are scheduled, and determine a time to the next trigger frame scheduled by the network device if aperiodic trigger frames are scheduled. In operation 506, the IoT device may be configured to transition to a shallow sleep or deep sleep mode based at least in part upon the time to the next trigger frame. The device may also be configured to determine one or more resources allocated by the network device for uplink data traffic. In operation 508, the device may also be configured to determine one or more sub-channels allocated to the communication station if OFDMA is allocated, or determine a number of spatial streams allocated to the communication station if MU-MIMO is allocated. In operation 510, the device may also be configured to receive, from the communication station, a timer synchronization function (TSF) of the network device, and synchronize an internal clock of the wireless communication device with the TSF of the network device. In operation 512, the IoT device may determine from one of the plurality of components a traffic indication map (TIM) of downlink buffered data indicating a group to which the wireless communication device belongs.

Figure 6:
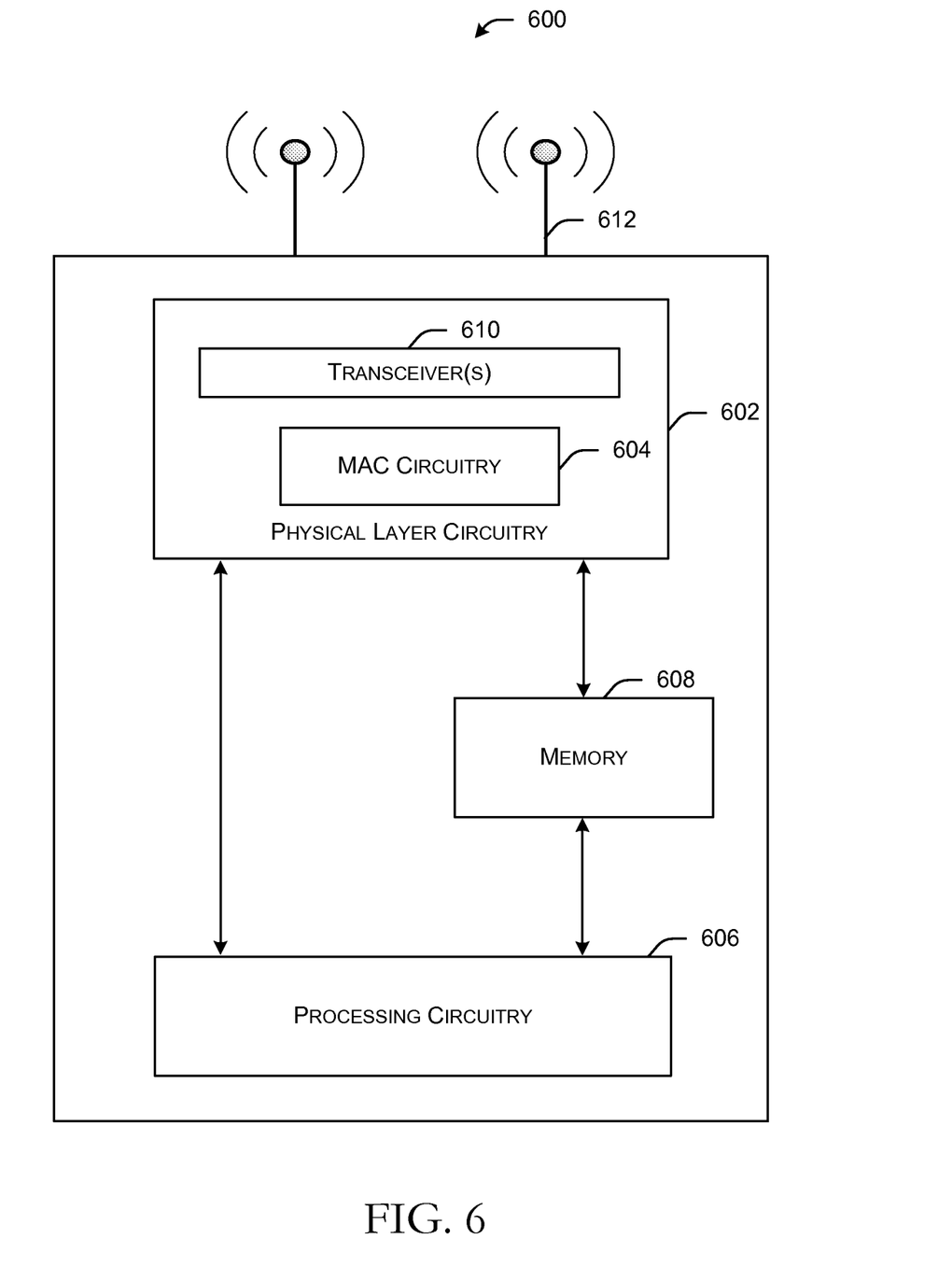
FIG. 6 illustrates a functional diagram of an example communication station or example access point, according to one or more example embodiments.

FIG. 6 shows a functional diagram of an exemplary communication station 600 in accordance with some embodiments. In one embodiment, FIG. 6 illustrates a functional block diagram of a communication station that may be suitable for use as an AP 102 (FIG. 1) or communication station STA 112, 114, 116 (FIG. 1) in accordance with some embodiments. The communication station 600 may also be suitable for use as a handheld device, mobile device, cellular telephone, smartphone, tablet, netbook, wireless terminal, laptop computer, wearable computer device, picocell, femtocell, High Data Rate (HDR) subscriber station, access point, access terminal, or other personal communication system (PCS) device.

The communication station 600 may include physical layer circuitry 602 having one or more transceivers 610 for transmitting and receiving signals to and from other communication stations using one or more antennas 612. The physical layer circuitry 602 may also include medium access control (MAC) circuitry 604 for controlling access to the wireless medium. The communication station 600 may also include processing circuitry 606, for example one or more processors, and one or more memories 608 arranged to perform the operations described herein. In some embodiments, the physical layer circuitry 602 and the processing circuitry 606 may be configured to perform operations detailed in FIGS. 2-5.

In accordance with some embodiments, the MAC circuitry 604 may be arranged to contend for a wireless medium and configure frames or packets for communicating over the wireless medium and the physical layer circuitry 602 may be arranged to transmit and receive signals. The physical layer circuitry 602 may include circuitry for modulation/demodulation, upconversion/downconversion, filtering, amplification, etc. In some embodiments, the processing circuitry 606 of the communication station 600 may include one or more processors. In other embodiments, two or more antennas 612 may be coupled to the physical layer circuitry 602 arranged for sending and receiving signals. The memory 608 may store information for configuring the processing circuitry 606 to perform operations for configuring and transmitting message frames and performing the various operations described herein. The memory 608 may include any type of memory, including non-transitory memory, for storing information in a form readable by a machine (e.g., a computer). For example, the memory 608 may include a computer-readable storage device may, read-only memory (ROM), random-access memory (RAM), magnetic disk storage media, optical storage media, flash-memory devices and other storage devices and media.

In some embodiments, the communication station 600 may be part of a portable wireless communication device, such as an IoT device, a personal digital assistant (PDA), a laptop or portable computer with wireless communication capability, a web tablet, a wireless telephone, a smartphone, a wireless headset, a pager, an instant messaging device, a digital camera, an access point, a television, a medical device (e.g., a heart rate monitor, a blood pressure monitor, etc.), a wearable computer device, or another device that may receive and/or transmit information wirelessly.

In some embodiments, the communication station 600 may include one or more antennas 612. The antennas 612 may include one or more directional or omnidirectional antennas, including, for example, dipole antennas, monopole antennas, patch antennas, loop antennas, microstrip antennas or other types of antennas suitable for transmission of RF signals. In some embodiments, instead of two or more antennas, a single antenna with multiple apertures may be used. In these embodiments, each aperture may be considered a separate antenna. In some multiple-input multiple-output (MIMO) embodiments, the antennas may be effectively separated for spatial diversity and the different channel characteristics that may result between each of the antennas and the antennas of a transmitting station.

In some embodiments, the communication station 600 may include one or more of a keyboard, a display, a non-volatile memory port, multiple antennas, a graphics processor, an application processor, speakers, and other mobile device elements. The display may be an LCD screen including a touch screen.

Although the communication station 600 is illustrated as having several separate functional elements, two or more of the functional elements may be combined and may be implemented by combinations of software-configured elements, such as processing elements including digital signal processors (DSPs), and/or other hardware elements. For example, some elements may include one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements of the communication station 600 may refer to one or more processes operating on one or more processing elements.

Certain embodiments may be implemented in one or a combination of hardware, firmware and software. Other embodiments may also be implemented as instructions stored on a computer-readable storage device, which may be read and executed by at least one processor to perform the operations described herein. A computer-readable storage device may include any non-transitory memory mechanism for storing information in a form readable by a machine (e.g., a computer). For example, a computer-readable storage device may include read-only memory (ROM), random-access memory (RAM), magnetic disk storage media, optical storage media, flash-memory devices, and other storage devices and media. In some embodiments, the communication station 600 may include one or more processors and may be configured with instructions stored on a computer-readable storage device memory.

Figure 7:
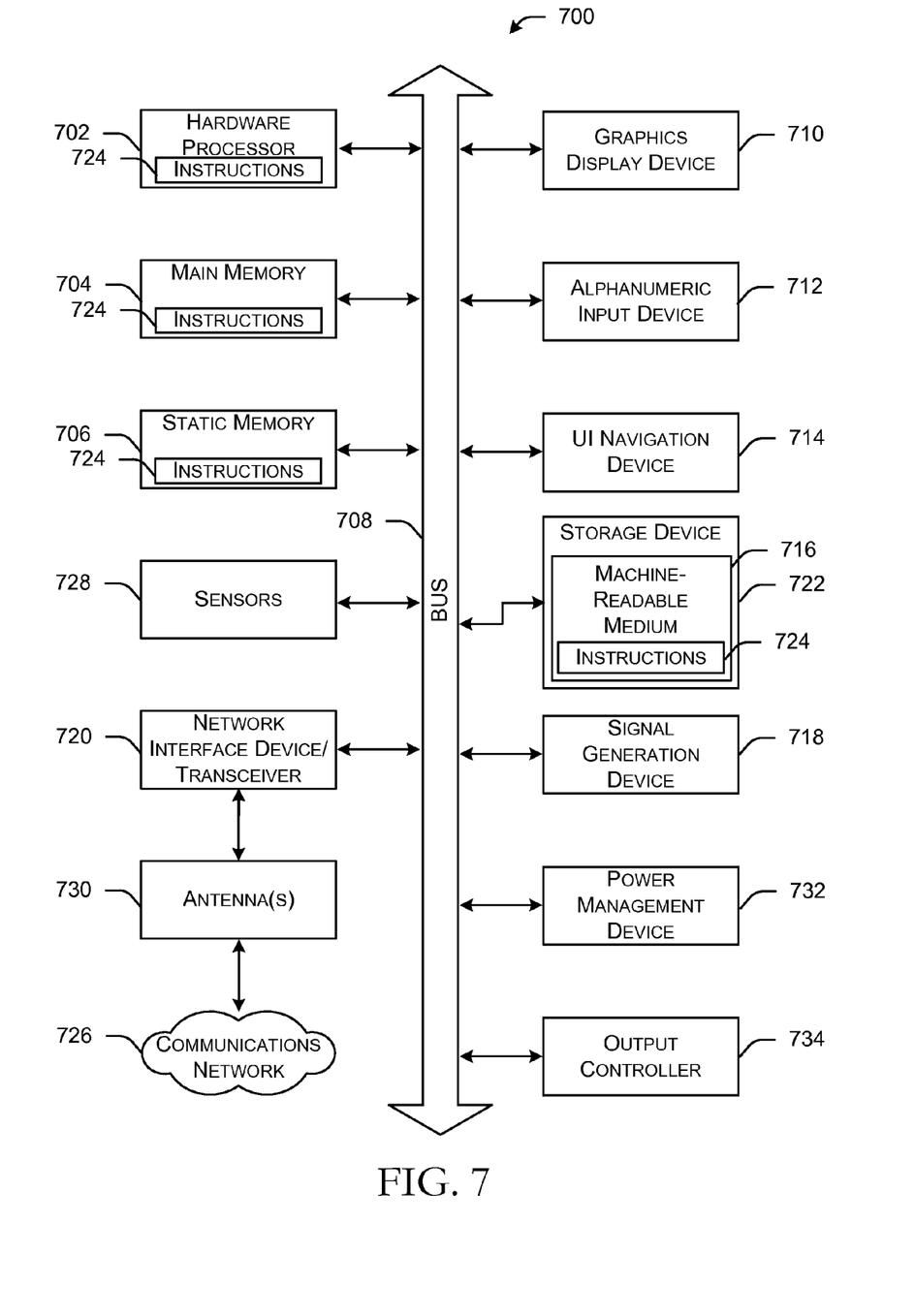
FIG. 7 shows a block diagram of an example of a machine upon which any of one or more techniques (e.g., methods) according to one or more embodiments discussed herein may be performed.

FIG. 7 illustrates a block diagram of an example of an IoT device 700 or system upon which any one or more of the techniques (e.g., methodologies) discussed herein may be performed. In other embodiments, the machine 700 may operate as a standalone device or may be connected (e.g., networked) to other machines. In a networked deployment, the machine 700 may operate in the capacity of a server machine, a client machine, or both in server-client network environments. In an example, the machine 700 may act as a peer machine in peer-to-peer (P2P) (or other distributed) network environment. The machine 700 may be a personal computer (PC), a tablet PC, a set-top box (STB), a personal digital assistant (PDA), a mobile telephone, wearable computer device, a web appliance, a network router, switch or bridge, or any machine capable of executing instructions (sequential or otherwise) that specify actions to be taken by that machine, such as a base station. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), or other computer cluster configurations.

Examples, as described herein, may include, or may operate on, logic or a number of components, modules, or mechanisms. Modules are tangible entities (e.g., hardware) capable of performing specified operations when operating. A module includes hardware. In an example, the hardware may be specifically configured to carry out a specific operation (e.g., hardwired). In another example, the hardware may include configurable execution units (e.g., transistors, circuits, etc.) and a computer readable medium containing instructions, where the instructions configure the execution units to carry out a specific operation when in operation. The configuring may occur under the direction of the executions units or a loading mechanism. Accordingly, the execution units are communicatively coupled to the computer readable medium when the device is operating. In this example, the execution units may be a member of more than one module. For example, under operation, the execution units may be configured by a first set of instructions to implement a first module at one point in time and reconfigured by a second set of instructions to implement a second module at a second point in time.

The machine (e.g., computer system) 700 may include a hardware processor 702 (e.g., a central processing unit (CPU), a graphics processing unit (GPU), a hardware processor core, or any combination thereof), a main memory 704 and a static memory 706, some or all of which may communicate with each other via an interlink (e.g., bus) 708. The machine 700 may further include a power management device 732, a graphics display device 710, an alphanumeric input device 712 (e.g., a keyboard), and a user interface (UI) navigation device 714 (e.g., a mouse). In an example, the graphics display device 710, alphanumeric input device 712 and UI navigation device 714 may be a touch screen display. The machine 700 may additionally include a storage device (i.e., drive unit) 716, a signal generation device 718 (e.g., a speaker), a network interface device/transceiver 720 coupled to antenna(s) 730, and one or more sensors 728, such as a global positioning system (GPS) sensor, compass, accelerometer, or other sensor. The machine 700 may include an output controller 734, such as a serial (e.g., universal serial bus (USB), parallel, or other wired or wireless (e.g., infrared (IR), near field communication (NFC), etc.) connection to communicate with or control one or more peripheral devices (e.g., a printer, card reader, etc.)

The storage device 716 may include a machine readable medium 722 on which is stored one or more sets of data structures or instructions 724 (e.g., software) embodying or utilized by any one or more of the techniques or functions described herein. The instructions 724 may also reside, completely or at least partially, within the main memory 704, within the static memory 706, or within the hardware processor 702 during execution thereof by the machine 700. In an example, one or any combination of the hardware processor 702, the main memory 704, the static memory 706, or the storage device 716 may constitute machine readable media.

While the machine readable medium 722 is illustrated as a single medium, the term "machine readable medium" may include a single medium or multiple media (e.g., a centralized or distributed database, and/or associated caches and servers) configured to store the one or more instructions 724.

The term "machine readable medium" may include any medium that is capable of storing, encoding, or carrying instructions for execution by the machine 700 and that cause the machine 700 to perform any one or more of the techniques of the present disclosure, or that is capable of storing, encoding or carrying data structures used by or associated with such instructions. Non-limiting machine readable medium examples may include solid-mode memories, and optical and magnetic media. In an example, a massed machine readable medium includes a machine readable medium with a plurality of particles having resting mass. Specific examples of massed machine readable media may include: non-volatile memory, such as semiconductor memory devices (e.g., Electrically Programmable Read-Only Memory (EPROM), or Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 724 may further be transmitted or received over a communications network 726 using a transmission medium via the network interface device/transceiver 720 utilizing any one of a number of transfer protocols (e.g., frame relay, internet protocol (IP), transmission control protocol (TCP), user datagram protocol (UDP), hypertext transfer protocol (HTTP), etc.). Example communications networks may include a local area network (LAN), a wide area network (WAN), a packet data network (e.g., the Internet), mobile telephone networks (e.g., cellular networks), Plain Old Telephone (POTS) networks, wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, and peer-to-peer (P2P) networks, among others. In an example, the network interface device/transceiver 720 may include one or more physical jacks (e.g., Ethernet, coaxial, or phone jacks) or one or more antennas to connect to the communications network 726. In an example, the network interface device/transceiver 720 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions for execution by the machine 700, and includes digital or analog communications signals or other intangible media to facilitate communication of such software.

Example Embodiments

One example embodiment is a wireless communication device including at least one memory comprising computer-executable instructions stored thereon, and one or more processors to execute the computer-executable instructions to determine, based upon a type of a recipient, a periodicity for scheduling one or more trigger frames within a beacon interval, the periodicity being periodic or aperiodic, generate one or more trigger frames comprising one or more components comprising scheduling information, wherein the scheduling information indicates a countdown to the next trigger frame if periodic trigger frames are scheduled and indicates a time to the next trigger frame if aperiodic trigger frames are scheduled and send, to a communication station, the one or more trigger frames based on the periodicity The device may also be configured to determine one or more resources allocated to the communication station for uplink data traffic. The device may further be configured to determine whether the resources are allocated using orthogonal frequency division multiple access (OFDMA) or multi-user multiple-input multiple-output (MU-MIMO) protocol. The device may further be configured to determine one or more sub-channels allocated to the communication station if OFDMA is selected. The device may also be configured to determine a number of spatial streams allocated to the communication station if MU-MIMO is selected. The device may also be configured to transmit, to the communication station, a timer synchronization function (TSF) of the device. The plurality of components may include a traffic indication map (TIM) of downlink buffered data.

Another example embodiment is a non-transitory computer readable medium including instructions stored thereon, which when executed by at least one processor of a wireless communication device, cause the wireless communication device to perform operations of determining, based upon a type of a recipient, a periodicity for scheduling one or more trigger frames within a beacon interval, the periodicity being periodic or aperiodic, generating one or more trigger frames comprising one or more components comprising scheduling information, wherein the scheduling information indicates a countdown to the next trigger frame if periodic trigger frames are scheduled and indicates a time to the next trigger frame if aperiodic trigger frames are scheduled, and sending, to a communication station, the one or more trigger frames based on the periodicity. The instructions may also include determining one or more resources allocated to the communication station for uplink data traffic. The instructions may further include determining whether the resources are allocated using orthogonal frequency division multiple access (OFDMA) or multi-user multiple-input multiple-output (MU-MIMO) protocol. The instructions may also include determining one or more sub-channels allocated to the communication station if OFDMA is selected. The instructions may also include determining a number of spatial streams allocated to the communication station if MU-MIMO is selected. The instructions may further include transmitting, to the communication station, a timer synchronization function (TSF) of the device. The plurality of components may include a traffic indication map (TIM) of downlink buffered data.

Another example embodiment is a wireless communication device including at least one memory comprising computer-executable instructions stored thereon, and one or more processors to execute the computer-executable instructions to receive, from a network device, one or more trigger frames comprising a plurality of components, a first component of the plurality of components indicating whether one or more trigger frames within a beacon interval are scheduled in a periodic or aperiodic manner, and determine a countdown to the next trigger frame if periodic frames are scheduled and determine a time to the next trigger frame if aperiodic trigger frames are scheduled. The device may also be configured to transition to a shallow sleep or deep sleep mode based at least in part upon the time to the next trigger frame. The device may also be configured to determine one or more resources allocated by the network device for uplink data traffic. The device may also be configured to determine one or more sub-channels allocated to the communication station if OFDMA is allocated, or determine a number of spatial streams allocated to the communication station if MU-MIMO is allocated. The device may also be configured to receive, from the communication station, a timer synchronization function (TSF) of the network device, and synchronize an internal clock of the wireless communication device with the TSF of the network device. The plurality of components can include a traffic indication map (TIM) of downlink buffered data indicating a group to which the wireless communication device belongs.

Another example embodiment is a non-transitory computer readable medium including instructions stored thereon, which when executed by at least one processor of a wireless communication device, cause the wireless communication device to receive, from a network device, one or more trigger frames comprising a plurality of components, the plurality of components indicating whether one or more trigger frames within a beacon interval are scheduled in a periodic or aperiodic manner, wherein if periodic trigger frames are scheduled, then further indicating a countdown, and if aperiodic trigger frames are scheduled, then further indicating a time to the next trigger frame scheduled by the network device. The device may also be configured to transition to a shallow sleep or deep sleep mode based at least in part upon the time to the next trigger frame. The device may also be configured to determine one or more resources allocated by the network device for uplink data traffic. The device may also be configured to determine one or more sub-channels allocated to the communication station if OFDMA is allocated, or determine a number of spatial streams allocated to the communication station if MU-MIMO is allocated. The device may also be configured to receive, from the communication station, a timer synchronization function (TSF) of the network device, and synchronize an internal clock of the wireless communication device with the TSF of the network device. The plurality of components can include a traffic indication map (TIM) of downlink buffered data indicating a group to which the wireless communication device belongs.

While there have been shown, described and pointed out, fundamental novel features of the invention as applied to the exemplary embodiments thereof, it will be understood that various omissions and substitutions and changes in the form and details of devices illustrated, and in their operation, may be made by those skilled in the art without departing from the spirit of the invention. Moreover, it is expressly intended that all combinations of those elements and/or method operations, which perform substantially the same function in substantially the same way to achieve the same results, are within the scope of the disclosure. Moreover, it should be recognized that structures and/or elements and/or method operations shown and/or described in connection with any disclosed form or embodiment of the disclosure may be incorporated in any other disclosed or described or suggested form or embodiment as a general matter of design choice. It is the intention, therefore, to be limited only as indicated by the scope of the claims appended hereto.

What is claimed is:

1. A wireless communication device comprising:
at least one memory comprising computer-executable instructions stored thereon; and
one or more processors to execute the computer-executable instructions to:
  determine a beacon interval for sending one or more trigger frames;
  generate a first periodic trigger frame of the one or more trigger frames comprising one or more first components comprising first scheduling information, wherein the first scheduling information indicates a countdown to a next first periodic trigger frame;
  generate a second aperiodic trigger frame of the one or more trigger frames comprising one or more second components comprising second scheduling information, wherein the second scheduling information indicates a time to a next second aperiodic trigger frame;
  send, to a first recipient device, the first periodic trigger frame; and
  send, to a second recipient device, the second aperiodic trigger frame.

2. The device of claim 1, wherein the one or more processors are further configured to execute the computer-executable instructions to:
determine, based on resource availability, one or more resources to be allocated to the first recipient device for uplink data traffic.

3. The device of claim 2, wherein the one or more processors are further configured to execute the computer-executable instructions to:
determine whether the resources are allocated using orthogonal frequency division multiple access (OFDMA) or multi-user multiple-input multiple-output (MU-MIMO) protocol.

4. The device of claim 3, wherein the one or more processors are further configured to execute the computer-executable instructions to:
determine one or more sub-channels allocated to the first recipient device if OFDMA protocol is utilized to allocate resources.

5. The device of claim 3, wherein the one or more processors are further configured to execute the computer-executable instructions to:
determine a number of spatial streams allocated to the first recipient device if MU-MIMO protocol is utilized to allocate resources.

6. The device of claim 1, wherein the one or more processors are further configured to execute the computer-executable instructions to:
transmit, in one of the one or more first components, a timer synchronization function (TSF) comprising a clock time of the device.

7. The device of claim 1, wherein the one or more processors are further configured to execute the computer-executable instructions to:
transmit, in one of the one or more first components, a traffic indication map (TIM) for downlink buffered data.

8. A non-transitory computer readable medium including instructions stored thereon, which when executed by at least one processor of a wireless communication device, cause the wireless communication device to perform operations of:
determining a beacon interval for sending one or more trigger frames;
generating a first periodic trigger frame of the one or more trigger frames comprising one or more first components comprising first scheduling information, wherein the first scheduling information indicates a countdown to a next first periodic trigger frame;
generating a second aperiodic trigger frame of the one or more trigger frames comprising one or more second components comprising second scheduling information, wherein the second scheduling information indicates a time to a next second aperiodic trigger frame;
sending, to a first recipient device, the first periodic trigger frame; and
sending, to a second recipient device, the second aperiodic trigger frame.

9. The medium of claim 8, further comprising the instructions of:
determining, based on resource availability, one or more resources allocated to the first recipient device for uplink data traffic.

10. The medium of claim 9, further comprising the instructions of:
determining whether the resources are allocated using orthogonal frequency division multiple access (OFDMA) or multi-user multiple-input multiple-output (MU-MIMO) protocol.

11. The medium of claim 10, further comprising the instructions of:
determining one or more sub-channels allocated to the first recipient device if OFDMA protocol is utilized to allocate resources.

12. The medium of claim 10, further comprising the instructions of:
determining a number of spatial streams allocated to the first recipient device if MU-MIMO protocol is utilized to allocate resources.

13. The medium of claim 8, further comprising the instructions of:
transmitting, in one of the one or more first components, a timer synchronization function (TSF) comprising a clock time of the device.

14. The medium of claim 8, further comprising the instructions of:
transmitting, in one of the one or more first components, a traffic indication map (TIM) for downlink buffered data.

15. A wireless communication device comprising:
at least one memory comprising computer-executable instructions stored thereon; and
one or more processors to execute the computer-executable instructions to:
  receive, from a network device, a first periodic trigger frame from one or more trigger frames sent during a beacon interval, wherein the first periodic trigger frame comprises a plurality of first components, a component of the plurality of first components indicating a countdown to a next first periodic trigger frame; and receive, from the network device, a second aperiodic trigger frame from the one or more trigger frames, wherein the second aperiodic trigger frame comprises a plurality of second components, a component of the plurality of second components indicating a time to a next second aperiodic trigger frame.

16. The device of claim 15, wherein the one or more processors are further configured to execute the computer-executable instructions to:

transition to a shallow sleep or deep sleep mode based at least in part upon the time to the next second aperiodic trigger frame.

17. The device of claim 15, wherein the one or more processors are further configured to execute the computer-executable instructions to:

determine, based on a second component of the plurality of first components, one or more resources allocated by the network device for uplink data traffic.

18. The device of claim 17, wherein the one or more processors are further configured to execute the computer-executable instructions to:

determine, based on a third component of the plurality of first components, one or more sub-channels allocated to the wireless communication device if OFDMA is allocated; or determine, based on the third component of the plurality of first components, a number of spatial streams allocated to the wireless communication device if MU-MIMO is allocated.

19. The device of claim 15, wherein the one or more processors are further configured to execute the computer-executable instructions to:

receive, from the network device, a timer synchronization function (TSF) comprising a clock time of the network device in a fourth component of the plurality of first components; and synchronize an internal clock of the wireless communication device with the clock time of the network device.

20. The device of claim 15, wherein a fifth component of the plurality of first components comprises a traffic indication map (TIM) for downlink buffered data indicating a group to which the wireless communication device belongs.

* * * * *